(12) United States Patent
Arlt

(10) Patent No.: US 7,980,152 B2
(45) Date of Patent: Jul. 19, 2011

(54) RACK AND PINION STEERING GEAR ASSEMBLY HAVING SELF-ADJUSTING ECCENTRIC RACK BEARING

(75) Inventor: George E. Arlt, Midland, MI (US)

(73) Assignee: Nexteer (Beijing) Technology Co., Ltd.

( * ) Notice: Subject to any disclaimer, the term of this patent is extended or adjusted under 35 U.S.C. 154(b) by 472 days.

(21) Appl. No.: 12/102,249

(22) Filed: Apr. 14, 2008

(65) Prior Publication Data

US 2008/0184830 A1 Aug. 7, 2008

Related U.S. Application Data

(63) Continuation-in-part of application No. 11/409,111, filed on Apr. 21, 2006, application No. 12/102,249.

(60) Provisional application No. 60/695,494, filed on Jun. 30, 2005, provisional application No. 60/930,062, filed on May 14, 2007.

(51) Int. Cl.
*F16H 1/04* (2006.01)

(52) U.S. Cl. .......... 74/422; 74/409; 74/388 PS; 384/255

(58) Field of Classification Search ............... 74/388 PS, 74/409, 411; 384/40, 255, 447; 403/87; 411/6, 536
See application file for complete search history.

(56) References Cited

U.S. PATENT DOCUMENTS

| | | | | |
|---|---|---|---|---|
| 1,443,685 A * | 1/1923 | Huff | ............................... | 74/500 |
| 1,565,264 A * | 12/1925 | Dubi | ........................... | 74/570.21 |
| 1,706,809 A * | 3/1929 | Osburn | ........................... | 74/500 |
| 1,722,561 A * | 7/1929 | Coutts | ............................... | 403/25 |
| 3,698,748 A * | 10/1972 | Petri | ............................... | 403/328 |
| 3,708,216 A * | 1/1973 | Gerling | ........................... | 384/312 |
| 3,820,415 A * | 6/1974 | Cass | ............................... | 74/498 |
| 3,828,622 A * | 8/1974 | Neff | ............................... | 74/409 |
| 3,872,774 A * | 3/1975 | Forster et al. | ................... | 91/400 |
| 4,095,482 A | 6/1978 | Kirschner | | |
| 4,145,107 A * | 3/1979 | De Haitre | ..................... | 439/801 |

(Continued)

FOREIGN PATENT DOCUMENTS

EP 1738989 A1 1/2007

(Continued)

OTHER PUBLICATIONS

European Search Report dated Jul. 24, 2008 for European Application No. 08154810.9-1523 / 1992546.

*Primary Examiner* — Richard W Ridley
*Assistant Examiner* — Matthew A Johnson
(74) *Attorney, Agent, or Firm* — Cantor Colburn LLP

(57) ABSTRACT

A steering apparatus includes a housing defining a chamber and an aperture extending into the chamber. A rack is disposed within the chamber and moveable along a longitudinal axis. A pinion extends into the chamber for meshing engagement with the rack. A bearing supports the rack within the chamber relative to the housing. The bearing includes a wall having a continuously varying radial thickness. An adjustment mechanism includes a shaft partially disposed within the aperture in threaded engagement with the aperture and engaging the bearing for rotating the bearing about the longitudinal axis, thereby repositioning the rack relative to the pinion. A plug is disposed within the aperture. A spring is disposed within the aperture between the plug and the shaft to bias against the shaft, thereby urging rotational threaded movement of the shaft to produce linear movement of the shaft into engagement with the bearing.

12 Claims, 4 Drawing Sheets

U.S. PATENT DOCUMENTS

| | | | |
|---|---|---|---|
| 4,224,833 A | | 9/1980 | Jablonsky |
| 4,403,522 A | * | 9/1983 | Kumpar .................. 74/89 |
| 4,691,583 A | | 9/1987 | Taig |
| 4,815,329 A | | 3/1989 | Anstgar et al. |
| 4,979,405 A | * | 12/1990 | Hagele et al. ............... 74/422 |
| 5,109,753 A | * | 5/1992 | Kobayashi .............. 91/375 A |
| 5,265,691 A | * | 11/1993 | Konishi et al. ............. 180/400 |
| 5,802,755 A | * | 9/1998 | Tortorici et al. ........... 42/75.02 |
| 6,119,540 A | | 9/2000 | Phillips |
| 6,244,125 B1 | * | 6/2001 | Sano .................. 74/388 PS |
| 6,247,375 B1 | | 6/2001 | Gierc et al. |
| 6,409,111 B1 | | 6/2002 | Kokko |
| 6,435,050 B1 | | 8/2002 | Tanke, II et al. |
| 7,281,444 B1 | | 10/2007 | Bishop |
| 2003/0074996 A1 | | 4/2003 | Camp |
| 2006/0266140 A1 | * | 11/2006 | Harer ..................... 74/89.12 |
| 2007/0000341 A1 | | 1/2007 | Arlt et al. |
| 2007/0209463 A1 | | 9/2007 | Song et al. |

FOREIGN PATENT DOCUMENTS

| | | |
|---|---|---|
| GB | 655130 A1 | 7/1951 |
| GB | 1074357 A1 | 7/1967 |

* cited by examiner

RACK AND PINION STEERING GEAR ASSEMBLY HAVING SELF-ADJUSTING ECCENTRIC RACK BEARING

CROSS REFERENCE TO RELATED APPLICATION

This application is a continuation-in-part of U.S. patent application Ser. No. 11/409,111 filed on Apr. 21, 2006, which claims the benefit of U.S. Provisional Patent Application Ser. No. 60/695,494 filed on Jun. 30, 2005; and claims the benefit of U.S. Provisional Patent Application Ser. No. 60/930,062 filed on May 14, 2007 and U.S. Provisional Patent are hereby incorporated by reference.

BACKGROUND OF THE INVENTION

1. Field of the Invention

The subject invention generally relates to a power steering apparatus for turning steerable wheels on a vehicle.

2. Description of the Prior Art

Power steering systems having a rack and a pinion are utilized in nearly all of today's vehicles to steer at least two of the wheels of a vehicle. The steering wheel of the vehicle is typically connected to a pinion gear that is in meshing engagement with a rack. The rack and pinion is supported in a housing and the rack translates the rotational movement of the pinion and steering wheel into a linear movement. The linear movement of the rack is translated to the steerable wheels of the car typically by a tie rod connected to each of the steerable wheels. In addition, power steering systems typically include an assisting force that provides a pressure or a force in proportion to the rotation of the steering wheel for assisting the linear movement of the rack. The assisting force is an additional systems that may be a hydraulic system utilizing a hydraulic piston coupled to the rack or electrical system utilizing an electric motor to supply the assisting force to the rack. In either system there is a desire to properly support and allow for adjustments to the meshing engagement between the pinion and the rack during the operational life of the power steering apparatus.

The rack can be supported in the housing by a bearing to reduce the frictional resistance on the linear movement of the rack within the housing. The bearing also supports the rack and typically is adjustable to position the rack in proper meshing engagement with the pinion. The bearing, such as that disclosed in U.S. Pat. No. 6,247,375, utilizes a yoke with a bearing surface that is eccentric to the housing to support and adjust the rack into proper meshing engagement with the pinion. The yoke is installed into a housing of the power steering assembly. Once installed, the yoke is rotated thereby adjusting the support and positioning the rack in proper meshing engagement with the pinion. The yoke is then permanently staked into position with a tool to deform the housing to support and secure the yoke in the rotated position. Since the yoke is staked into position the yoke and bearing support is not adjustable after the complete installation of the yoke into the assembly. Therefore the yoke does not allow for adjustment of the rack after the completed assembly of a vehicle, and further provides no adjustment during the operation of the power steering assembly.

Additional bearing designs such as the bearing disclosed in U.S. Pat. No. 6,435,050, utilizes a two-piece bearing design with a complex assembly involved to support the rack in the housing. The rack bearing is complex with a multiple piece bearing surface and additional bushings are needed to support the rack in proper meshing engagement with the pinion.

SUMMARY OF THE INVENTION AND ADVANTAGES

The subject invention provides a power steering apparatus. The power steering apparatus comprises a housing extending along a longitudinal axis. The housing includes a chamber having an inner surface. A rack is disposed within the chamber. The rack is moveable along the longitudinal axis. A pinion is supported by the housing. The pinion extends into the chamber for meshing engagement with the rack. A bearing engages the inner surface of the chamber. The bearing is disposed about the rack. The bearing includes a wall having a continuous varying radial thickness circumferentially surrounding the rack. An adjustment mechanism is supported by the housing. The adjustment mechanism is coupled to the bearing. The adjustment mechanism rotatably adjusts the bearing relative to the longitudinal axis to ensure tight meshing engagement between the pinion and the rack. A spring is supported by the housing and biases against the adjustment mechanism for automatically advancing the adjustment mechanism to continuously adjust the bearing.

Accordingly, the steering apparatus of the subject invention continuously and automatically adjusts the position of the rack relative to the pinion to provide for the proper meshing engagement between the rack and the pinion. The position of the rack relative to the pinion is adjusted by rotating the eccentric rack bearing about the longitudinal axis, thereby moving the rack into the proper meshing engagement. Thus, by maintaining the proper tight meshing engagement, the steering apparatus of the subject invention minimizes or eliminates undesirable vibration and noise caused by worn out gears having a loose and improper meshing engagement.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a power steering apparatus is shown generally at 20.

Figure 1:
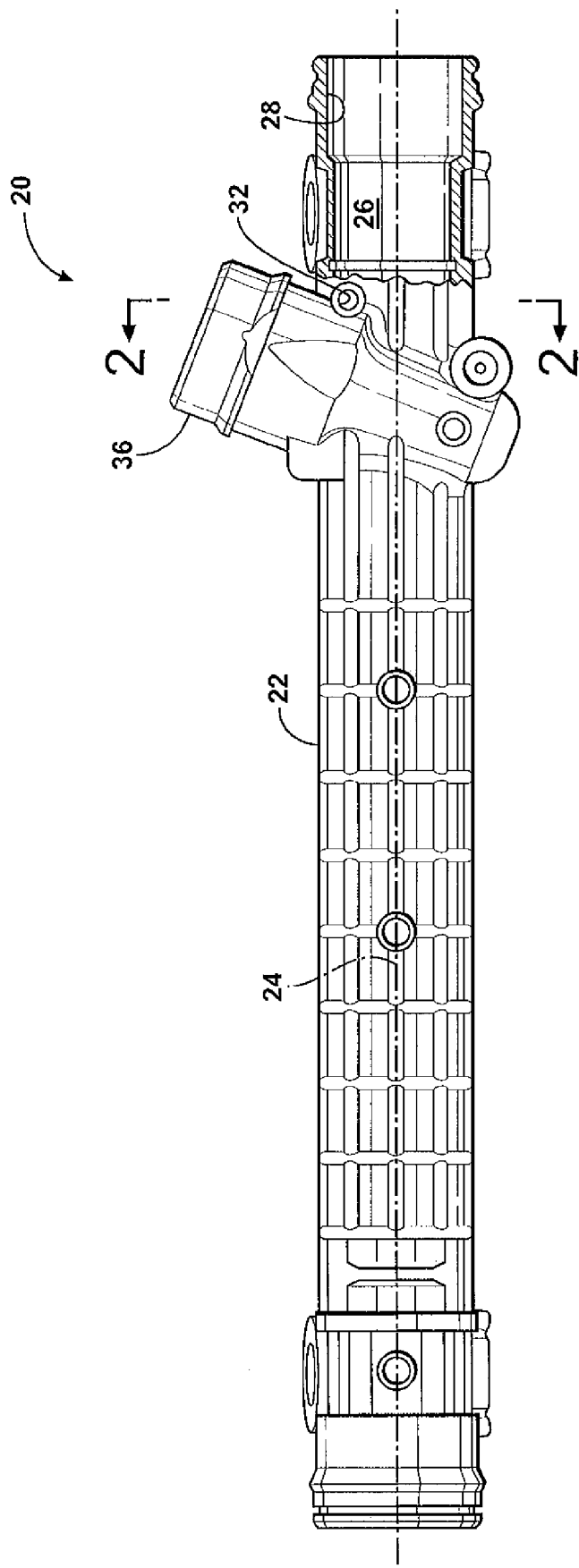
FIG. 1 is a plan view of a housing for a power steering apparatus.

Referring to FIG. 1, the power steering apparatus 20 includes a housing 22 extending along a longitudinal axis 24. The housing 22 defines a chamber 26 that extends along the longitudinal axis 24 and includes an inner surface 28. A rack 30 is disposed within the chamber 26 and is moveable along the longitudinal axis 24. The housing 22 defines an aperture 32 having threads. The aperture 32 extends into the chamber 26 for receiving an adjustment mechanism 34 (discussed in greater detail below). The housing 22 further includes an adjoining extension 36 that is connected to the chamber 26 and extends to rotatably support a pinion 38 (also discussed in greater detail below). The pinion 38 extends into the chamber 26 for meshing engagement with the rack 30. The adjoining extension 36, and the pinion 38, are disposed generally transverse to the longitudinal axis 24 and the chamber 26.

Figure 2:
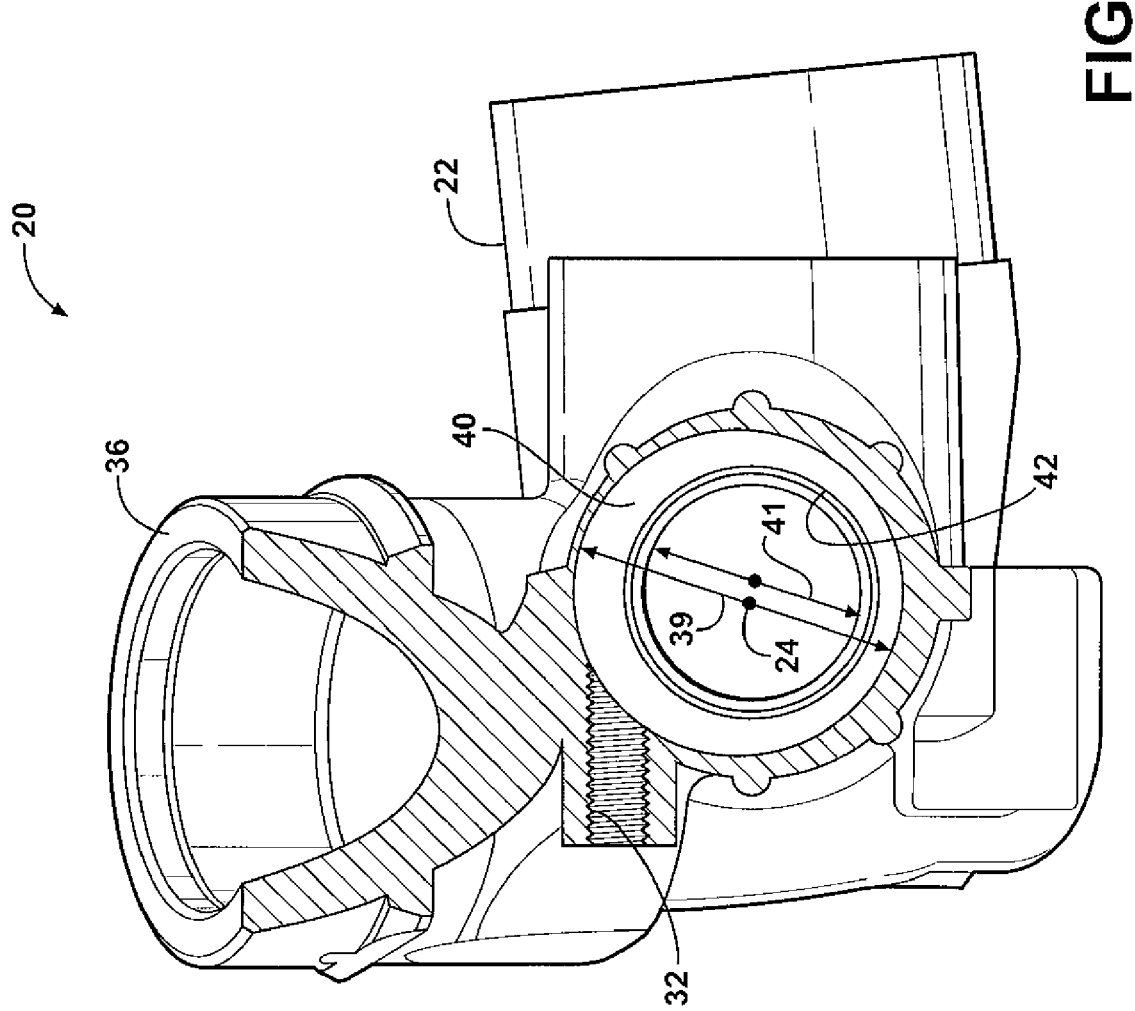
FIG. 2 is a cross sectional view of the housing along cut line 2-2 shown in FIG. 1.

Referring to FIG. 2, the inner surface 28 defines a first diameter 39 having a center on the longitudinal axis 24. A bearing 40 defines a second diameter 41 having a center on a second axis. The first diameter 39 can be offset an amount which will vary depending on the design of the inner surface 28 and the bearing 40 to be supported within the inner surface 28. However, as is known in the art the inner surface 28 of the housing 22 can have different diameters and configurations with varying offset distances between the longitudinal axis 24 and the second axis. It is also appreciated that there can be no offset, which will depend on the bearing 40 design, the rack 30 configuration, and the space and size constraints on the power steering apparatus 20 within the given application. It is also appreciated by one skilled in the art that the inner surface 28 of the housing 22 can be configured to various geometries for supporting and locating the bearing 40, and the rack 30 within the housing 22, as will be further discussed below.

As described above and shown in FIG. 3, the rack 30 is disposed within the chamber 26 of the housing 22 and moves linearly along the longitudinal axis 24. The rack 30 moves in response to rotational movement of the pinion 38 as is known in the art. The pinion 38 is rotatably supported in the adjoining extension 36 of the housing 22. The rack 30 defines a plurality of teeth for meshing with the pinion 38 as is well known in the art. The rack 30 translates the rotational movement of the pinion 38 to a linear movement. In a typical application, such as a passenger vehicle, the pinion 38 is connected to the steering wheel (not shown) and rotates in relationship to a movement of the steering wheel by a driver. The rack 30 translates the rotational movement of the pinion 38 into the linear movement which is connected to and moves the steerable wheels of a vehicle, typically through a tie rod engaging each of the steerable wheels. As known in the art, the power steering apparatus 20 typically includes an assisting force (not shown) to move the rack 30 within the housing 22. The assisting force is commonly created by a mechanical system such as a hydraulic, an electric or various other assisting technologies as are known in the art.

Figure 3:
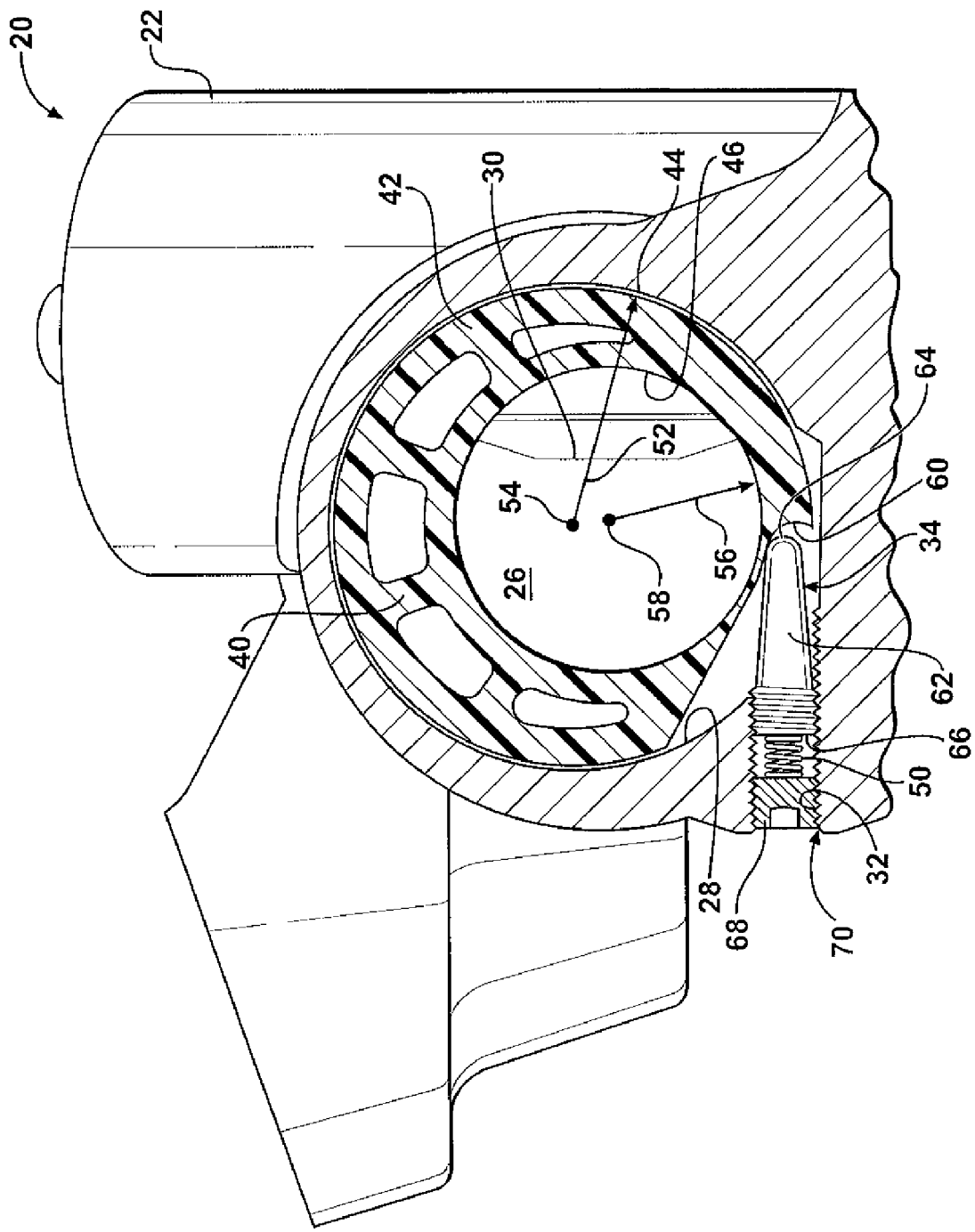
FIG. 3 is a partial cross sectional view showing a bearing and an adjustment mechanism in the housing.
Figure 4:
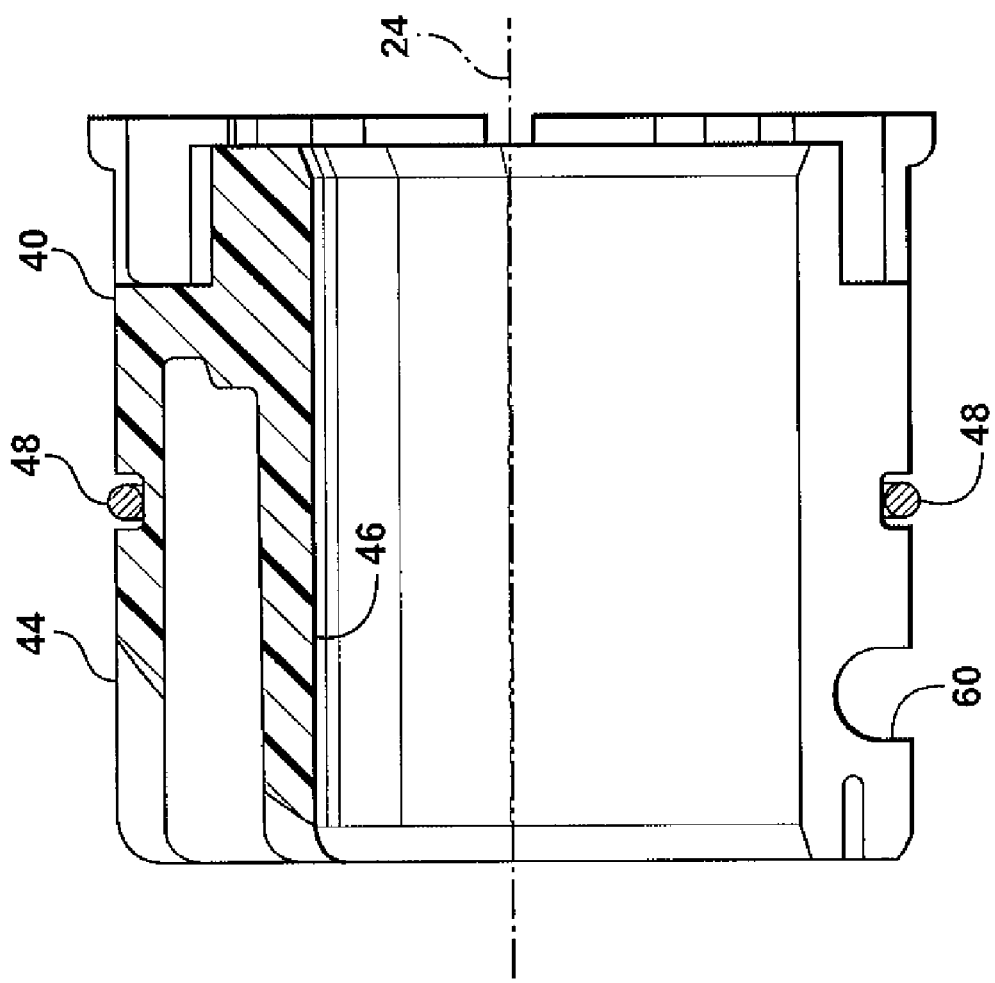
FIG. 4 is a cross sectional view of the bearing.

Referring to FIGS. 3 and 4, the rack 30 is supported in the housing 22 by a bearing 40, with the bearing 40 engaging the inner surface 28 of the chamber 26 and disposed about the rack 30. The bearing 40 of the subject invention includes a wall 42 having a continuous varying radial thickness circumferentially surrounding the rack 30 in the housing 22. The wall 42 of the bearing 40 has an outer face 44 and an inner face 46. A de-lashing device 48 interconnects the bearing 40 and the housing 22. The de-lashing device 48 dampens the lash movements of the rack 30 within the bearing 40 against the inner surface 28 of the housing 22 and acts like a spring 50 to resist rotational movement between the bearing 40 and said housing 22. The de-lashing device 48 may include an elastomeric material and be configured in any suitable manner as one skilled in the art would recognize. The de-lashing device 48 may further be defined as an o-ring 48 that is compressed between the inner surface 28 of the chamber 26 and the outer face 44 of the bearing 40. Preferably, the o-ring 48 is a polymeric material with elastic properties and thereby provides dampening of the lash movements of the rack 30 relative to the pinion 38 and housing 22. Preferably, the o-ring 48 is disposed within a channel defined by the outer face 44 of the bearing 40.

As described above, the wall 42 of the bearing 40 includes the outer face 44 and inner face 46. The outer face 44 is defined by an outer radius 52. The outer face 44 is generally circular and defines an external circumference having a first center point 54. The wall 42 is further defined by the inner face 46 having an inner radius 56. The inner face 46 is generally circular and defines an internal circumference having a second center point 58. The second center point 58 is spaced a distance from the first center point 54 to define an amount of eccentricity between the outer circumference and the inner circumference which thereby defines the varying radial thickness of the wall 42. The varying radial thickness is gradual allowing for a gradual and smooth adjustment of the bearing 40 by the adjustment device, as discussed below.

The adjustment mechanism 34 is supported by the housing 22, and is coupled to the bearing 40. The adjustment mechanism 34 rotatably adjusts the bearing 40 relative to the longitudinal axis 24 to ensure tight meshing engagement between the pinion 38 and the rack 30. It should be appreciated that as the teeth on the pinion 38 and the rack 30 wear down, the meshing engagement between the teeth on the pinion 38 and the teeth on the rack 30 loosens, thereby causing undesirable vibration and noise. Accordingly, the adjustment mechanism 34 rotates the bearing 40 about the longitudinal axis 24, and by way of the eccentric wall 42 thickness of the bearing 40, re-positions the rack 30 relative to the pinion 38 to maintain the proper tight meshing engagement between the teeth on the rack 30 and the teeth on the pinion 38.

The wall 42 of the bearing 40 defines a seat 60. The seat 60 is disposed near the outer face 44 of the wall 42. The adjustment mechanism 34 engages the seat 60. More specifically, the adjustment mechanism 34 includes a shaft 62, with the shaft 62 including a first end 64 abutting the seat 60. The first end 64 of the shaft 62 abuts the seat 60 in a generally tangential relationship relative to the bearing 40, near an outer circumference of the bearing 40. Accordingly, linear movement of the shaft 62 creates a torque in the bearing 40 about the longitudinal axis 24. The torque in the bearing 40 rotates the bearing 40 about the longitudinal axis 24.

As best shown in FIG. 3, a spring 50 is supported by the housing 22 within the aperture 32. The spring 50 biases against the adjustment device for automatically advancing the adjustment device, and thereby continuously adjusting the bearing 40 as the teeth on the rack 30 and the teeth on the pinion 38 continuously wear from repeated use. Preferably, the spring 50 includes a coil spring 50. However, it should be appreciated that the spring 50 may include some other device not shown or described herein that is capable of biasing the shaft 62 linearly outward from the aperture 32.

As described above, the aperture 32 includes threads. The shaft 62 includes a second end 66 having threads. The second end 66 of the shaft 62 is in threaded engagement with the threads on the aperture 32. The threaded engagement between the shaft 62 and the aperture 32 provides for rotational movement of the shaft 62 relative to the housing 22, which translates into linear movement of the shaft 62 along an axis of the aperture 32 relative to the housing 22.

A plug 68 is disposed within the aperture 32 and fixedly attached to the housing 22. Preferably, the plug 68 is in threaded engagement with the aperture 32, and includes a setscrew. However, it should be appreciated that the plug 68 may include some other device affixed to the housing 22 within the aperture 32 to seal the aperture 32 and provide a surface for the spring 50 to bias against. Preferably, a locking mechanism 70 fixedly secures the plug 68 within the aperture 32 to prevent rotation of the plug 68 relative to the housing 22. The locking mechanism 70 may include a staking device, a jam nut, a thread adhesive, or some other suitable device. During assembly of the power steering apparatus 20, the plug 68 is threaded into the aperture 32 to a desired position, which corresponds to a desired initial position of the rack 30 and the bearing 40. After the plug 68 is properly positioned within the aperture 32, the locking device is positioned, applied or attached to securely fix the position of the plug 68 relative to the housing 22.

The spring 50 is disposed between the plug 68 and the second end 66 of the shaft 62. Accordingly, the spring 50 biases against the plug 68 to urge the shaft 62 into rotational movement to thereby produce linear movement of the shaft 62.

In operation, rotational movement of the bearing 40 relative to the housing 22 is resisted by the de-lashing device 48. The spring 50, disposed between the shaft 62 and the plug 68, biases the shaft 62 toward the bearing 40. As the meshing engagement between the rack 30 and the pinion 38 loosens, rotational movement of the bearing 40 relative to the housing 22 becomes possible. When a biasing force from the spring 50 becomes greater than a resisting force produced by the de-lashing device 48, the spring 50 causes the shaft 62 to rotate, thereby linearly moving the shaft 62 within the aperture 32 toward the bearing 40. This linear movement of the shaft 62 rotates the bearing 40. Because of the eccentricity of the bearing 40, as the bearing 40 rotates, the rack 30 is brought back into tight meshing engagement with the pinion 38. Thus, a force imbalance between the biasing force of the spring 50 and the resisting force of the de-lashing device 48 act on the shaft 62 to cause the shaft 62 to translate axially along the axis of the aperture 32. The biasing force and the resisting force tend to remain in balance until the rack 30 and the pinion 38 wear down, at which time the biasing force of the spring 50 becomes greater than the resisting fore of the de-lashing device 48. The threaded connection between the shaft 62 and the aperture 32 prevents backward movement of the shaft 62 toward the plug 68 in the event of a high impact load.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A power steering apparatus comprising:
a housing extending along a longitudinal axis and having a chamber with an inner surface, said housing having an aperture extending therein, said aperture defining threads in said housing;
a rack disposed within said chamber for movement along said longitudinal axis;
a pinion supported by said housing and extending into said chamber for meshing engagement with said rack;
a bearing engaging said inner surface of said chamber and disposed about said rack with said bearing having a wall of a continuous varying radial thickness circumferentially surrounding said rack;
an adjustment mechanism supported by said housing and coupled to said bearing for rotatably adjusting said bearing relative to said longitudinal axis to ensure tight meshing engagement between said pinion and said rack, said adjustment mechanism having a shaft with a threaded portion and a non-threaded portion, a length of said non-threaded portion being at least two times a length of said threaded portion of said shaft, said threaded portion being in threaded engagement with said threads for rotational movement of said shaft relative to said housing;
a spring supported by said housing and biasing said shaft into rotational movement within said threads of said housing to induce automatic linear movement of said shaft for adjusting a rotational position of said bearing.

2. An apparatus as set forth in claim 1 further comprising a plug disposed within said aperture and fixedly attached to said housing.

3. An apparatus as set forth in claim 2 further comprising a locking mechanism fixedly securing said plug within said aperture to prevent rotation of said plug relative to said housing.

4. An apparatus as set forth in claim 2 wherein said spring is disposed within said aperture between said plug and said threaded portion of said shaft.

5. An apparatus as set forth in claim 4 wherein said spring includes a coil spring.

6. An apparatus as set forth in claim 4 wherein said wall of said bearing defines a seat and with said adjustment mechanism engaging said seat.

7. An apparatus as set forth in claim 6 wherein said non-threaded portion of said shaft abuts said seat in a generally tangential relationship to said bearing.

8. An apparatus as set forth in claim 4 further comprising a de-lashing device interconnecting said bearing and said housing.

9. An apparatus as set forth in claim 8 wherein said de-lashing device includes an o-ring compressed between said bearing and said housing.

10. An apparatus as set forth in claim 9 wherein said o-ring includes an elastomeric material.

11. An apparatus as set forth in claim 8 wherein said wall of said bearing includes an outer face having an outer radius defining a first center point and an inner face having an inner radius defining a second center point spaced a distance from said first center point to define said varying radial thickness of said wall.

12. A power steering apparatus comprising:
a housing extending along a longitudinal axis and having a chamber with an inner surface, said housing has an aperture extending therein, said aperture defining threads in said housing;
a rack disposed within said chamber for movement along said longitudinal axis;
a pinion supported by said housing and extending into said chamber for meshing engagement with said rack;
a bearing engaging said inner surface of said chamber and disposed about said rack with said bearing having a wall of a continuous varying radial thickness circumferentially surrounding said rack;
an adjustment mechanism supported by said housing and coupled to said bearing for rotatably adjusting said bearing relative to said longitudinal axis to ensure tight meshing engagement between said pinion and said rack, said adjustment mechanism having a shaft with a threaded portion and a non-threaded portion, said threaded portion being in threaded engagement with said threads for rotational movement of said shaft relative to said housing; and
a spring supported by said housing and biasing said shaft into rotational movement within said threads of said housing to induce automatic linear movement of said shaft for adjusting a rotational position of said bearing, said spring having a diameter less than a diameter of the threaded portion of the shaft.

* * * * *